United States Patent [19]
Hollander et al.

[11] Patent Number: 5,234,231
[45] Date of Patent: Aug. 10, 1993

[54] COMBINED POSTER AND CATALOG CONSTRUCTION

[75] Inventors: Milton B. Hollander, Stamford; Louis Rivera, Branford, both of Conn.

[73] Assignee: Omega Engineering, Inc., Stamford, Conn.

[21] Appl. No.: 926,506

[22] Filed: Aug. 7, 1992

[51] Int. Cl.$^5$ .............................................. B42D 15/00
[52] U.S. Cl. ........................................ 281/2; 281/5; 283/34
[58] Field of Search ................... 283/34, 35, 117; 281/51, 2, 5

[56] References Cited

U.S. PATENT DOCUMENTS

| | | | |
|---|---|---|---|
| 1,161,580 | 11/1915 | Allen | 281/2 X |
| 3,248,806 | 5/1966 | Schrader | 283/34 X |
| 4,487,431 | 12/1984 | Kelly | 283/34 X |
| 4,538,833 | 9/1985 | Trikillis | 281/5 X |
| 4,934,741 | 6/1990 | Landry et al. | 283/35 X |
| 5,018,764 | 5/1991 | Beardell | 281/2 |

FOREIGN PATENT DOCUMENTS 473939 10/1937 United Kingdom .................. 283/5

*Primary Examiner*—Paul A. Bell
*Attorney, Agent, or Firm*—Bruce E. Hosmer; Howard S. Reiter

[57] ABSTRACT

A sheet of flat paper or poster stock has information printed on one side in the form of separate and independent areas of discrete information units, and a large-scale poster-like pattern occupying substantially the entire available area of the opposite side surface of the sheet. A plurality of straight crease lines are marked on one surface of the sheet, arranged to define a coordinate grid-like pattern surrounding the various discrete information units, such that the sheet may be folded conveniently along the crease lines to form a fold-out booklet having a plurality of leaves with units of information printed on each leaf, similar in nature to the pages of a book. In one form of the invention, the crease lines are defined by a plurality of weakened sections of the poster stock material having a fold resistance that is less than the unweakened portions of the sheet, but is sufficient to withstand the forces produced by rolling the sheet into a diameter consistent with commonly available postal mailing tubes, so that the sheet may be rolled for transport and then unrolled into substantially flat, unfolded condition for display of information printed on at least one surface of the sheet in the form of a poster.

7 Claims, 1 Drawing Sheet

COMBINED POSTER AND CATALOG CONSTRUCTION

BACKGROUND OF THE INVENTION

This invention relates generally to printed information display material, and more particularly, it relates to a dual-purpose two-sided printed sheet, and still more particularly, to such a sheet that is constructed to convert from a poster configuration to a multi-page catalog booklet configuration.

Printed sheets of paper stock material, having patterns and/or textual information printed on opposite sides thereof, are generally well-known. Two-sided printed material folded into accordion shape to facilitate handling as well as inspection of the printed information is generally well-known, also. Road maps and tourist-information brochures are commonly available examples of such printed material. However, in all such prior art printed material, the user is intended to examine small areas of printed matter at discrete locations, and such printed material has not previously provided large-scale display of a unified poster-like pattern intended to be viewed as a single unit, on one entire side of the sheet, in association with multiple individualized page-like areas of discrete information units on the opposite side.

Multi-page catalogs of information concerning the features and operation of various industrial goods have been widely used for many years. Moderately-sized posters and display sheets, on the order of 3 feet by 5 feet, but frequently somewhat less, also have been widely used for the purpose of attracting the attention of potential users and purchasers of such goods. However, it has not previously been suggested that the functions of advertising and display posters for industrial goods and catalogs for such goods might be combined usefully so that the functions of each are readily available, selectively and alternately, in a single-sheet structure.

Accordingly, it is an object of this invention to provide a printed sheet construction that combines the functions of a single sheet poster and a multi-page catalog in a single sheet of printed material.

It is another object of this invention to provide a single sheet, combined poster-catalog structure that be used conveniently for either one of its intended functions, and that is easy and inexpensive to manufacture.

These, and other and further objects, features and advantages of this invention will be made apparent to those having skill in this art by reference to the following specification, considered together with the accompanying drawings, in which:

DETAILED DESCRIPTION OF THE DISCLOSURE

Figure 1:
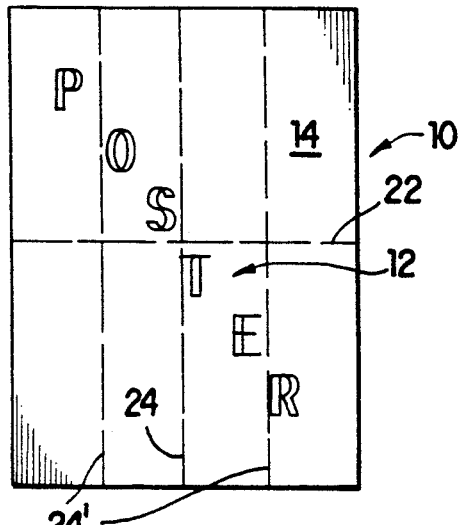
FIG. 1 is a front plan view of a first surface of a combined poster and catalog construction in accordance with this invention, in the form of a single sheet of paper stock bearing an illustrative poster printed on a first surface thereof.

Referring now more particularly to the drawings, and specifically to FIG. 1, a combined poster and catalog construction in accordance with this invention may be seen to comprise a sheet 10 of paper stock having a large-scale poster-like pattern of information 12 occupying substantially the entire area of a first side surface 14.

Figure 2:
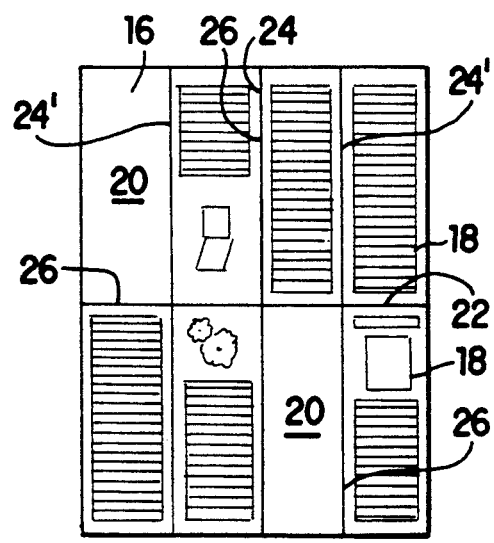
FIG. 2 is rear plan view of the single sheet structure of FIG. 1, showing plural independent areas of discrete information units printed on a second surface thereof, on the reverse side of the first surface, in accordance with this invention.

A second side surface 16, on the reverse side of sheet 10 from side surface 14, bears a plurality of discrete information units 18 printed in independent areas 20 of the surface 16, as shown in FIG. 2. The plurality of separately defined areas 20 on surface 16 are delineated by a first transversely extending crease line 22, and a second transversely extending crease line 24, oriented at substantially right angles to first line 22. The crease lines 22, 24, thus aligned, together define an elementary coordinate grid, which preferably may be expanded by positioning one or more additional crease line 24' parallel to and spaced apart from second crease line 24, to increase the number of independent areas within the grid to any reasonable and practical value.

Figure 3:
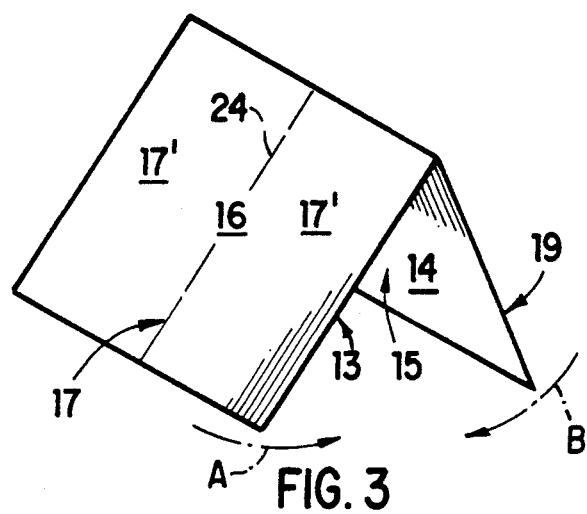
FIG. 3 is a pictorial representation showing a first-step relative displacement of portions of the single sheet of FIG. 1 in accordance with this invention.

It can be seen most clearly in FIG. 3 that when the sheet 10 is folded about crease line 22 in the direction generally of arrows A and B, a first portion 13 of first side surface 14 is moved toward inwardly abutting face to face relationship with a second portion 15, while a first outer portion 17 of second side surface 16 is moved into outwardly and oppositely facing relationship to a second outer portion 19 of second side surface 16.

Figure 4:
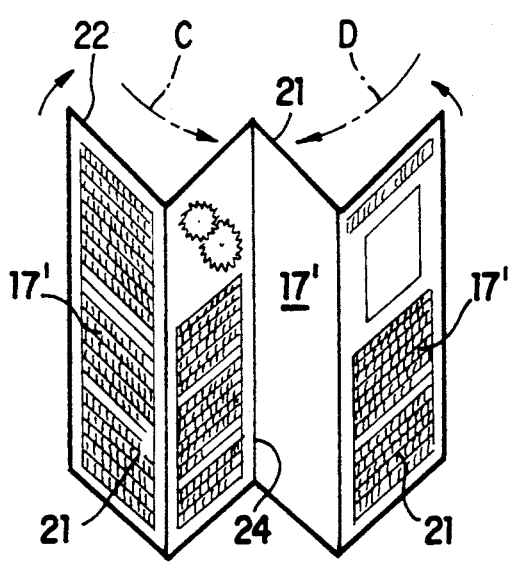
FIG. 4 is a pictorial representation of the sheet of FIG. 3, showing a second-step further relative displacement of portions of the sheet relative to FIG. 3.

In the illustrated form of the invention, further shown clearly in FIG. 4, the parts 17' of sheet 10 that are on opposite sides of adjacent parallel crease lines 24, 24' may be folded alternately in opposite directions, generally in the directions of arrows C and D, in accordion fashion, to form a composite structure having adjacent abutting "leaves" 21 hingedly coupled together in the manner of a booklet.

In another form of the invention, the sheet 10 may be made available in substantially flat, uncreased condition, as shown in FIGS. 1 and 2. In this form of the invention, the crease lines are delineated by visible printed markings 26 coincident with crease lines 22, 24, 24', on one of the side surfaces 14, 16. The markings are provided preferably on the side surface 16 bearing the discrete information areas, herein defined as the second side surface. This form of marking permits the sheet to be creased conveniently by a user, in the manner and sequence herein described, to convert it readily from poster format to booklet format.

To further enhance the convenience of use of this form of the invention, the printed markings 26 may include printed information such as text or numerical instructions concerning the proper sequence to be followed when the sheet is being folded.

When the sheet 10 has been creased in the manner described, the crease line markings are evident generally only along the folded or creased edges of the individually formed "leaves", and therefore they are substantially "invisible" to the user. The poster-like pattern on the first side surface 14 of the sheet 10 is substantially concealed within the resulting folded structure. To further enhance convenience in displacing the relative portions of the sheet from flat structure to folded structure, the crease lines markings may be numbered, coded or otherwise identified, in any convenient manner, to indicate the proper sequence and direction of folding.

In a further embodiment of the invention conforming generally to the illustrations of FIG. 1 through 4, the sheet 10 is formed of generally flat poster stock, in which selected ones or all of the crease lines 22, 24, 24' are defined by weakened straight line sections. The weakened sections have a fold resistance that is less than the unweakened portions of the sheet, but is sufficient to withstand the forces produced by rolling the sheet into a diameter consistent with commonly available postal mailing tubes, so that the sheet may be rolled for transport and then unrolled into substantially flat, unfolded condition for display of large-scale poster-like information printed on one surface. When desired, the sheet may be folded conveniently along the predetermined weakened sections to form a fold-out booklet having a plurality of leaves with units of information printed on each leaf, similar in nature to the pages of a book, as previously described herein.

In a preferred form of the invention, the discrete areas of printed information 18, are oriented in "mirror image" relationship to the first crease line 22, so that the "top" edge of each area is closest to line 22 and all text material in each area is read "downwardly" in a direction proceeding away from line 22. This arrangement assures that the top edge of a booklet formed as illustrated in FIG. 4 of the drawings will correspond generally to the top edge of all text material on both the first and second parts 17' of the first outer portion 17 of side surface 16, for example. Accordingly, all text material on both the inner and the outer parts of the folded structure will be oriented in the same "up and down" direction, if desired.

While preferred embodiments of the invention have been shown and described in detail, other modifications will be readily apparent to those having ordinary skill in this art. Accordingly, this disclosure should be regarded as exemplary rather than limiting, and the scope of the invention should be considered to be defined solely by the following claims.

What is claimed is:

1. A combination catalog and display poster, comprising:
   a sheet of paper stock having a first side surface and a second side surface;
   said sheet having a first transversely extending crease line about which said sheet may be reversely folded onto itself, to cause a first portion of said first side surface to lie in inwardly abutting face to face contact with a second portion of said first side surface, and to cause a first outer portion of said second side surface to lie in outwardly and oppositely facing relationship to a second outer portion of said second side surface, so as to define a folded structure characterized by at least two thicknesses of said sheet of paper stock;
   said sheet having a second transversely extending crease line positioned substantially normally to said first transversely extending crease line between the ends thereof, about which said sheet may be further reversely folded onto itself to define a second folded structure in which the second outer portion of said second side surface is divided into a first part and a second part lying on opposite sides of said second transversely extending crease line and in outwardly and oppositely facing relationship to each other, such that the thickness of said folded structure is increased to at least four thicknesses of said sheet of paper stock;
   wherein, a substantially unitary overall pattern of printed material utilizes substantially all of the surface area of said first side surface for display in the manner of a poster when all of said crease lines are unfolded, and said second side surface of said sheet is utilized by a plurality of separate and discreet areas of printed matter positioned in the sequentially adjacent portions of said second outer surface on opposite sides of said second transversely extending crease line, to form a first series of pages of a book on said first surface portion, and a second series of pages on said second surface portion, when said crease lines are folded as defined.

2. A combination catalog and display poster in accordance with claim 1, wherein:
   said sheet of paper stock is further characterized by at least one additional crease line oriented substantially parallel to said second transversely extending crease line in spaced apart relationship thereto; and
   said second part of said second outer portion of said second side surface may be reversely folded onto itself about said at least one additional crease line to define an accordion-like folded structure having at least three adjacent subportions of said second outer portion folded in alternating directions in accordion fashion, such that two adjacent subportions of said second outer surface, on opposite sides of said at least one additional crease line, will be aligned in abutting face to face contact.

3. A combination catalog and display poster in accordance with claim 1, wherein:
   said folded structure is characterized by a plurality of additional parallel spaced-apart crease lines oriented substantially parallel to said second transversely extending crease line in spaced apart relationship thereto; and
   said second part of said second outer portion of said second side surface may be reversely folded onto itself about said additional parallel spaced-apart crease lines to define an accordion-like folded structure alternating in direction in accordion fashion, such that adjacent portions of said first outer surface on opposite sides of a first one of said additional crease lines will be aligned in abutting face to face contact, and adjacent portions of said second outer surface on opposite sides of a second one of said parallel crease lines next adjacent to said first one, will be aligned in parallel abutting face to face contact.

4. A combination catalog and display poster in accordance with claim 1, wherein:
   each of said transversely extending crease lines is defined by a weakened section of said sheet that is foldable as a hinge when subjected to a force that is, less than the force required to fold the stock material of said sheet about a non-weakened line, and greater than the force resulting from rolling said sheet into the form of a tube having a diameter not substantially less than that of a commonly available postal mailing tube.

5. A combination catalog and display poster in accordance with claim 1, wherein:
each of said transversely extending crease lines is marked on said second side surface by printed indicia providing visual guidance for manual folding of said sheet about said crease lines.

6. A combination catalog and display poster in accordance with claim 5, wherein:
said printed indicia further include information providing directions concerning the proper sequence of folding.

7. A combination catalog and display poster, comprising:
a sheet of paper stock having a first side and a second side;
said sheet being reversely folded onto itself along a first transverse crease line, causing a first portion of said first side to lie in abutting face to face contact with a second portion of said first side;
the reverse folding of said first sheet defining a folded structure having a first outer surface formed by a first portion of said second side, and an oppositely facing second outer surface formed by a second portion of said second side;
said folded structure being further reversely folded upon itself along a plurality of parallel spaced-apart crease lines oriented perpendicularly to said first transverse crease line, and alternating in direction in accordion fashion, such that adjacent portions of said first outer surface on opposite sides of a first one of said parallel crease lines are aligned in abutting face to face contact, and adjacent portions of said second outer surface on opposite sides of a second one of said parallel crease lines next adjacent to said first one, are aligned in parallel abutting face to face contact; wherein a substantially unitary overall pattern of printed material utilizes substantially all of the surface area of said first side for display in the manner of a poster when all of said crease lines are unfolded, and said second side of said sheet is utilized by a plurality of separate and discrete areas of printed matter positioned in the sequentially adjacent portions on opposite sides of said parallel spaced-apart crease lines to form a first series of sequential pages of a book on said first surface portion, and a continuing second series of sequential pages on said second surface portion when said crease lines are folded as defined.

* * * * *